United States Patent
Imbert et al.

(10) Patent No.: US 10,589,605 B2
(45) Date of Patent: Mar. 17, 2020

(54) OPENING PART OF A MOTOR VEHICLE

(71) Applicant: Flex-N-Gate France, Audincourt (FR)

(72) Inventors: Didier Imbert, Etupes (FR); Laurent Droz-Bartholet, Audincourt (FR); Christian Henigue, Suarce (FR)

(73) Assignee: Flex-N-Gate France, Audincourt (FR)

( * ) Notice: Subject to any disclaimer, the term of this patent is extended or adjusted under 35 U.S.C. 154(b) by 50 days.

(21) Appl. No.: 15/950,077

(22) Filed: Apr. 10, 2018

(65) Prior Publication Data

US 2018/0290523 A1 Oct. 11, 2018

(30) Foreign Application Priority Data

Apr. 11, 2017 (FR) ...................................... 17 53161

(51) Int. Cl.
| | | |
|---|---|---|
| *B60J 5/10* | (2006.01) | |
| *B60J 5/04* | (2006.01) | |
| *E05B 79/04* | (2014.01) | |
| *B62D 29/00* | (2006.01) | |

(52) U.S. Cl.
CPC .............. *B60J 5/107* (2013.01); *B60J 5/0433* (2013.01); *B60J 5/0484* (2013.01); *B62D 29/004* (2013.01); *E05B 79/04* (2013.01); *B60Y 2410/122* (2013.01)

(58) Field of Classification Search
CPC ....... B62D 29/004; B60J 5/107; B60J 5/0433; B60J 5/0484; B60Y 2410/122; E05B 79/04
USPC ............................................ 296/146.6, 146.8
See application file for complete search history.

(56) References Cited

U.S. PATENT DOCUMENTS

| | | | | |
|---|---|---|---|---|
| 7,537,256 | B2 * | 5/2009 | Gates ....................... | B60Q 1/56 296/1.07 |
| 9,610,829 | B1 * | 4/2017 | Stachewicz ............ | B60J 5/0444 |
| 2003/0107235 | A1 | 6/2003 | Komatsu | |
| 2004/0072006 | A1 * | 4/2004 | Staargaard ........ | B29C 45/14344 428/544 |
| 2012/0219748 | A1 * | 8/2012 | Gillard ............. | B29C 45/14836 428/76 |

(Continued)

FOREIGN PATENT DOCUMENTS

| | | |
|---|---|---|
| DE | 4237584 A1 | 5/1994 |
| EP | 1130279 | 9/2001 |

(Continued)

OTHER PUBLICATIONS

Preliminary Search Report dated Dec. 18, 2017 during the prosecution of French Patent Application No. 1753161.

*Primary Examiner* — Gregory A Blankenship
(74) *Attorney, Agent, or Firm* — Troutman Sanders LLP

(57) ABSTRACT

The invention relates to an opening part of a motor vehicle comprising a reinforcing element extending at least partially along a main plane, intended to reinforce fasteners and the environment of a lock of the opening part, and an envelope made from plastic, comprising an inner part overmolded at least partially on an inner face of the reinforcing element. The reinforcing element comprises at least one orifice, and the envelope comprises at least one external part including a segment passing through said orifice and a covering part locally covering one edge of the orifice on an outer face of the reinforcing element.

10 Claims, 2 Drawing Sheets

(56) References Cited

U.S. PATENT DOCUMENTS

Figure 1:
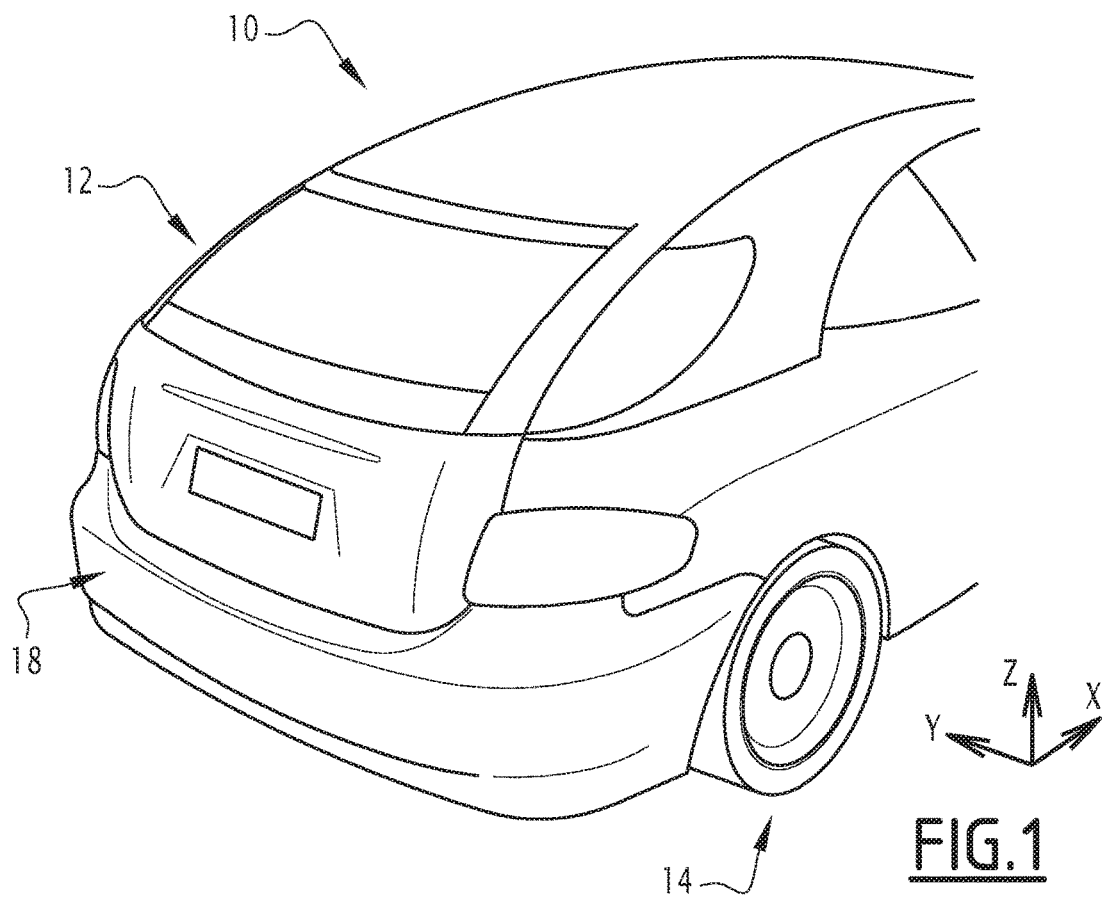

| | | | | |
|---|---|---|---|---|
| 2014/0124659 A1* | 5/2014 | Berheide | ................... | G01T 3/06 |
| | | | | 250/269.4 |
| 2015/0246596 A1* | 9/2015 | Kajigai | ................. | B60J 5/0431 |
| | | | | 296/146.6 |
| 2016/0303954 A1* | 10/2016 | Kawashima | ......... | B62D 35/007 |
| 2018/0056762 A1* | 3/2018 | Adachi | ................... | B60J 5/107 |
| 2018/0056763 A1* | 3/2018 | Motohashi | ............... | B60J 5/107 |
| 2018/0290523 A1* | 10/2018 | Imbert | .................. | B60J 5/0433 |

FOREIGN PATENT DOCUMENTS

| | | |
|---|---|---|
| JP | H0911829 | 1/1997 |
| JP | 2016043575 A | 4/2016 |

\* cited by examiner

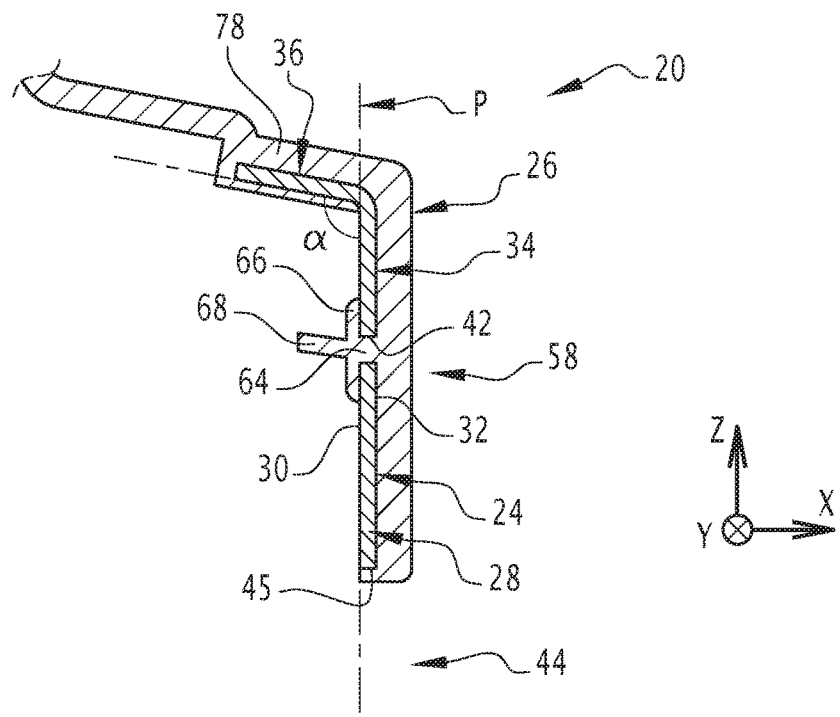
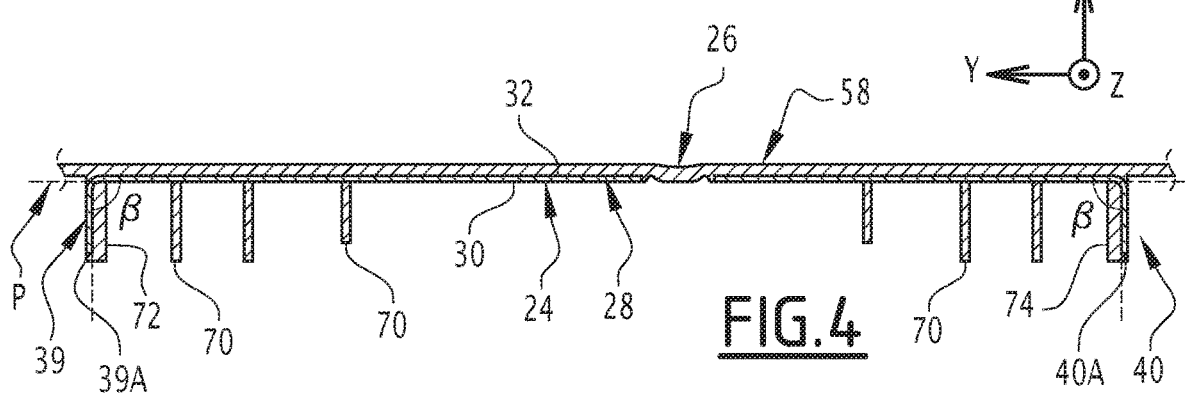
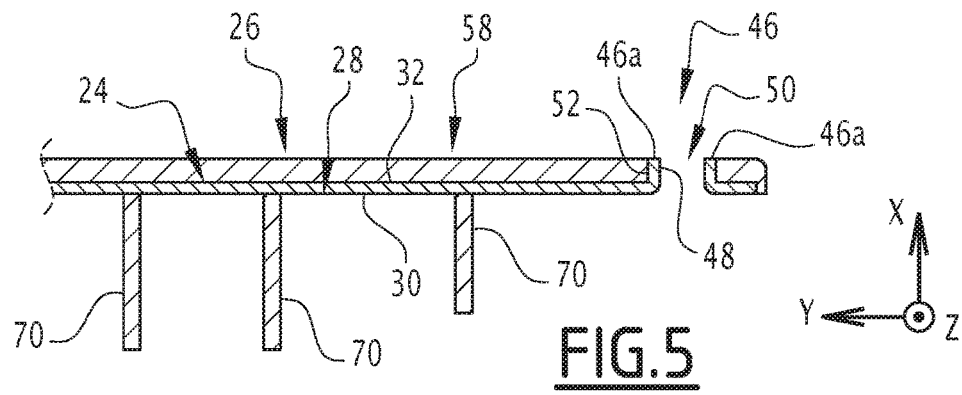

OPENING PART OF A MOTOR VEHICLE

CROSS-REFERENCE TO RELATED APPLICATIONS

The present patent application claims priority from French Patent Application No. FR1753161, filed on Apr. 11, 2017. The entire contents of which are incorporated by reference in their entirety.

FIELD OF THE INVENTION

The present invention relates to an opening part of a motor vehicle comprising a reinforcing element extending at least partially along a main plane, intended to reinforce fasteners and the environment of a lock of the opening part, and an envelope made from plastic, comprising an inner part overmolded at least partially on an inner face of the reinforcing element.

The invention for example relates to opening parts for motor vehicles, such as tailgates or doors.

BACKGROUND

An opening part for a motor vehicle is already known in the state of the art including a structural part made from plastic forming a body of the opening part.

In order to satisfy the constraints set out by vehicle builders, in particular relative to deformation of the opening part in flexion, torsion, lateral bearing, exceptional load (filed by Regulation 11 of the United Nations Economic Commission for Europe (UNECE), in its version dated Jun. 15, 2015, regarding uniform provisions concerning the approval of vehicles with regard to door latches and door retention components), etc., the structural rigidity of this part must be strengthened. The commonly adopted solution consists of attaching a reinforcing element, for example made from metal, to the plastic structural part in order to stiffen the assembly.

In a known manner, the reinforcing element is attached and screwed on the plastic structural part to form a reinforced structural part.

The fastening of the reinforcing element on the plastic structural part requires several operations, such as the placement of screwing inserts on the plastic part, the positioning of the reinforcement on the plastic part, the placement of pre-maintaining screws, and lastly an operation for screwing the reinforcing element on the plastic structural part.

The aforementioned multiple operations to fasten the reinforcing element on the structural part require a relatively significant amount of time and cause a substantial cost of the reinforced structural part.

Furthermore, the reinforcing element generally being fastened on the plastic structural part by screws, the stresses applied on the reinforced structural part are often concentrated on the fastening points at the screws and may exceed the acceptable thresholds for the plastic material of the structural part.

This results in poor strength of the reinforced structural part over time as well as a deterioration of the mechanical link between at the plastic structural part and the reinforcing element.

SUMMARY

One aim of the invention is to propose an opening part of a vehicle in which a good mechanical connection is provided between the envelope and the reinforcing part. One aim of the invention is also to propose an opening part of a vehicle that is inexpensive.

To that end, the invention relates to an opening part of a vehicle of the aforementioned type, wherein the reinforcing element comprises at least one orifice, and wherein the envelope comprises at least one external part including a segment traversing said orifice and a covering part locally covering one edge of the orifice on an outer face of the reinforcing element.

By causing a segment of the envelope to penetrate an orifice of the reinforcing element and providing a covering part on the outer face of the reinforcing element, a good mechanical link obtained in a single molding operation is provided between the envelope and the reinforcing part.

In particular, the segment and the covering area provide good adherence of the envelope to the reinforcing part.

The segment penetrating the orifice of the reinforcing element and the covering area also limit the movements that may appear between the reinforcing element and the envelope following the mechanical stresses applied on the opening part of the vehicle.

According to preferred embodiments of the invention, the opening part of a vehicle also has one or more of the following features, considered alone or according to any technically possible combination(s):

the at least one orifice has a circular shape and a center, and the covering part extends on the outer face of the reinforcing element over a limited area around the orifice and in all radial directions around the orifice, the covering part extending from the center of this orifice over a distance comprised between 0.5 millimeter and 30 millimeters along the said radial directions;

the reinforcing element comprises a plurality of orifices, the outer part of the envelope including a plurality of segments each traversing an orifice of the plurality of orifices of the reinforcing element and a plurality of covering parts each locally covering the edge of an orifice of the plurality of orifices on the outer face of the reinforcing element, the outer part of the envelope comprising at least one rib connecting the covering parts to one another;

the inner part of the envelope comprises a central portion covering at least part of the inner face of the reinforcing element, extending in a plane parallel to the main plane, the envelope further comprising at least one upper portion and one lower portion each extending from the central portion, the upper portion and the lower portion being inclined by a non-zero angle relative to the central portion and extending protruding from the central portion on the side of the outer face of the reinforcing element;

the outer part of the envelope includes at least one reinforcing rib protruding from the outer face of the reinforcing element, said reinforcing rib extending between the upper portion and the lower portion of the envelope;

the reinforcing element comprises a central part extending at least partially in the main plane P and curved lateral end parts forming a non-zero angle with the central part, the envelope comprising at least two end ribs extending between the upper portion and the lower portion of the envelope, each curved lateral end part of the reinforcing element being at least partially overmolded by an end rib;

an upper end of the reinforcing element is inclined relative to the central part of the reinforcing element, the upper end of the reinforcing element being overmolded by the envelope;

an opening is arranged in a thickness of the reinforcing element to receive a lock mechanism of the opening part, a border of the opening extending between the outer face and the inner face of the reinforcing element and being overmolded by the envelope;

the reinforcing element has at least one barrel protruding from the inner face of the reinforcing element, the barrel comprising a first wall defining a hole and a second wall overmolded by the envelope, the second wall being opposite the first wall;

the envelope is formed in a single piece;

said opening forms at least part of a tailgate comprising a lock fastened at least partly on the reinforcing element.

BRIEF DESCRIPTION OF THE S DRAWINGS

Figure 2:
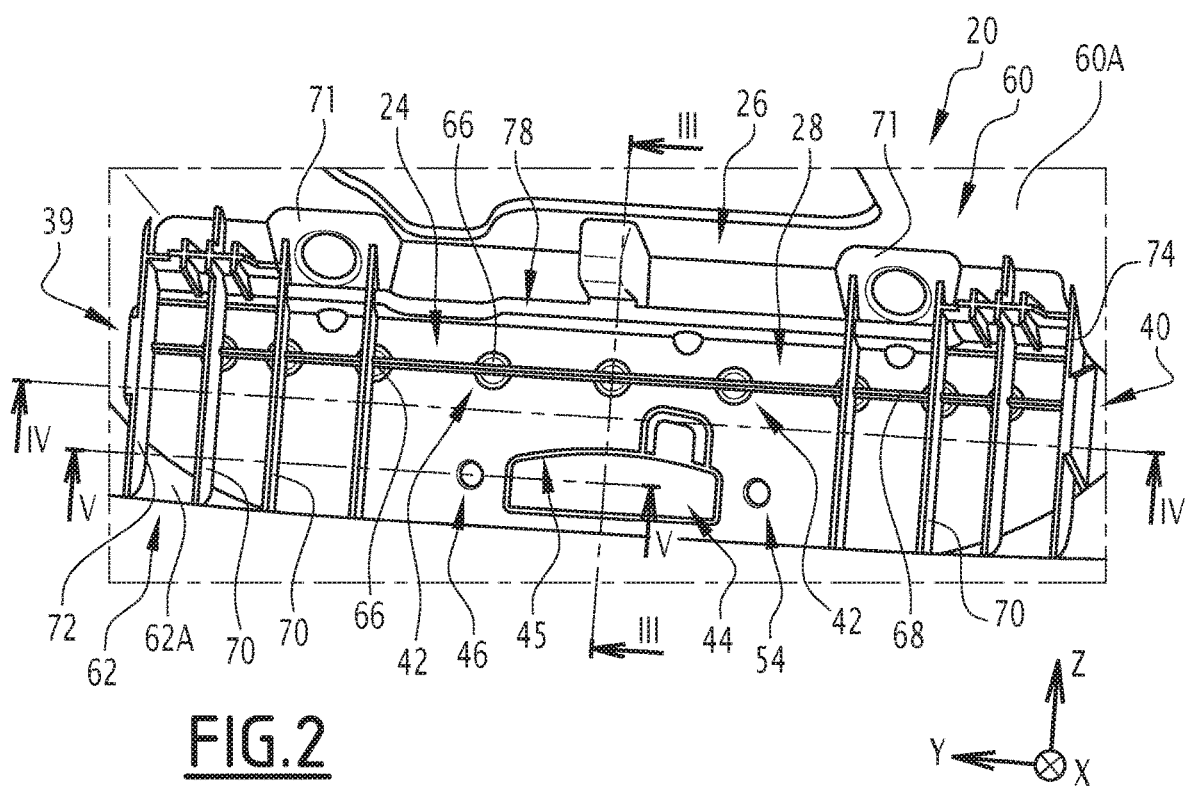

Other aspects and advantages of the invention will appear upon reading the following description, provided solely as an example and done in reference to the appended drawings, in which:

FIG. 1 is a perspective view of a motor vehicle comprising an opening part,

FIG. 2 is a detail view of an inner part of the opening part of the motor vehicle of FIG. 1, FIG. 3 is a sectional view of FIG. 2, defined along the cutting plane shown by the axis in FIG. 2, FIG. 4 is a sectional view of FIG. 2, defined along the cutting plane shown by the axis IV-IV in FIG. 2, and FIG. 5 is a half-sectional view of FIG. 2, defined along the cutting plane shown by the axis V-V in FIG. 2.

DETAILED DESCRIPTION

FIG. 1 shows a motor vehicle 10 comprising an opening part 12.

In the present description, a longitudinal direction is defined represented by the axis X, corresponding to the front-back direction of the vehicle 10, referred to in the rest of the description as "longitudinal direction X".

In the present description, a transverse direction is defined, perpendicular to the longitudinal direction, perpendicular to the spacing between the front wheels (not shown in the drawings) or the rear wheels 14 of the motor vehicle 10, referred to in the rest of the description as "transverse direction Y".

Furthermore, in the present description, an elevation direction is defined represented by the axis Z, referred to in the rest of the description as "elevation direction Z". The elevation direction Z is a direction perpendicular to the longitudinal direction X and to the transverse direction Y.

In the example embodiment described here, the opening part 12 is a tailgate for the rear trunk of the motor vehicle 10.

The opening part 12 is mounted articulated on a body element of the vehicle 10, near the upper edge of an opening for accessing the inner volume of the rear trunk. The inner volume of the rear trunk is defined in the lower part by a body element 18 of the vehicle 10.

The opening part 12 is able to pivot around an axis parallel to the transverse direction Y between an open position (not shown here), in which access to the trunk is possible, and a closed position, in which access to the trunk from outside the vehicle 10 is not possible.

Such an opening part 12 comprises a structural part 20, forming a body of the opening part 12, in which a lock is intended to be arranged making it possible to lock the opening part 12 in the closed position.

In the present example, the structural part 20 is not visible from outside the vehicle 10 and forms at least part of the inner face of the opening part.

In reference to FIGS. 2 and 3, the structural part 20 comprises a reinforcing element 24 and an envelope 26 made from plastic overmolded on the reinforcing element 24.

The reinforcing element 24 comprises a body 28. The body 28 has an outer face 30 and an inner face 32. The outer face 30 and the inner face 32 are substantially parallel to one another.

In the present description, "inner face" refers to a face oriented toward the inside of the vehicle 10, and "outer face" refers to a face oriented toward the outside of the vehicle 10. Furthermore, in the present description, "inner part" refers to a part of an element oriented toward the inside of the vehicle 10 and "outer part" refers to a part of an element oriented toward the outside of the vehicle 10.

In the present description, "thickness of the reinforcing element 24" also refers to a distance measured between the outer face 30 and the inner face 32 of the body 28 of the reinforcing element 24.

In reference to FIG. 3, the body 28 has a central part 34 extending along the main plane P, for example normal to the longitudinal direction X.

In the central part 34 of the body 28 of the reinforcing element 24, the outer face 30 and the inner face 32 of the reinforcing element 24 are substantially parallel to one another in a plane normal to the longitudinal direction X.

The body 28 further has an upper end part 36 that is curved relative to the central part 34 of said body 28, toward the outside of the vehicle 10. In the present description, "upper" refers to an element that is located above another element relative to the elevation direction Z of the vehicle 10.

The upper end part 36 of the reinforcing element 24 extends in a plane forming an angle $\alpha$ with the main plane P, in which the central part 34 of the body 28 extends. In other words, the upper end part 36 forms a non-zero angle $\alpha$ with the central part 34 of the body 28 of the reinforcing element 24. For example, the upper end part 36 forms an angle $\alpha$ comprised between 90 degrees and 180 degrees with the central part 34, for example 90 degrees.

In reference to FIG. 4, the body 28 also has two lateral end parts 39, 40 that are curved relative to the central part 34. The lateral end parts 39, 40 are parts of the body 28 situated on either side of the central part 34 of the body 28 in the transverse direction Y.

Each lateral end part 39, 40 extends in a plane forming a non-zero angle $\beta$ with the main plane P, in which the central part 34 of the reinforcing element 24 extends. In other words, each lateral end part 39, 40 forms a non-zero angle $\beta$ with the central part 34 of the body 28 of the reinforcing element 24. For example, each lateral end part 39, 40 forms an angle $\beta$ comprised between 90 degrees and 180 degrees with the central part 34. In the case at hand, the lateral end parts 39, 40 form an angle $\beta$ substantially equal to 90 degrees with the central part 34.

The body 28 further has at least one orifice 42, shown in FIG. 3. The orifice 42 is arranged in the central part 34 of the body 28.

The orifice 42 is a through orifice, i.e., it crosses the outer face 30 and the inner face 32 of the body 28.

According to one embodiment, the body 28 has a plurality of orifices 42 regularly distributed in the transverse direction Y. For example, the body 28 has between one and ten orifices 42.

Each orifice 42 has a center.

For example, each orifice 42 has a circular shape. In other words, each orifice 42 has a circular section in a cut plane normal to the longitudinal direction X.

For each orifice 42, a plurality of radial directions are defined. Each radial direction extends in a plane normal to the longitudinal direction X and passes through the center of this orifice 42.

For example, each orifice 42 has a radius comprised between 0.15 mm and 29.5 mm.

The body 28 also has at least one opening 44 arranged in the thickness of the reinforcing element 24, intended to accommodate at least one mechanism of the lock of the opening part 12 of the vehicle 10. More specifically, the opening 44 is arranged in a thickness of the central part 34 of the reinforcing element 24. The opening 44 constitutes a through hole, crossing the outer face 30 and the inner face 32 of the body 28 of the reinforcing element 24.

The opening 44 for example has a substantially rectangular section in a plane normal to the longitudinal direction X.

The opening 44 defines a border 45 of the body 28 of the reinforcing element 24. The border 45 corresponds to the part of the body 28 forming the periphery of the opening 44. The border 45 extends between the outer face 30 of the body 28 and the inner face 32 of said body 28. Thus, the border 45 constitutes a thickness of the body 28 of the reinforcing element.

In reference to FIG. 5, the reinforcing element 24 further comprises at least one barrel 46 protruding toward the inside of the inner face 32 of the body 28 of the reinforcing element 24. A barrel forms a tubular portion adapted to receive a screw.

The barrel 46 has a first wall 48 defining a hole 50 in the body 28 of the reinforcing element 24 and a second wall 52 protruding from the inner face 32 of the body 28. The second wall 52 is opposite the first wall 48 of the barrel 46, i.e., the second wall 52 of the barrel 46 forms the outer diameter of the hole 50 and the first wall 48 of the barrel 46 forms the inner diameter of the hole 50. In other words, the first wall 48 of the barrel 46 is oriented toward the inside of the hole 50 and the second wall 52 is oriented toward the outside of the hole 50.

The first wall 48 of the barrel 46 is obtained by deformation of the outer face 30 of the body 28 of the reinforcing element 24 and the second wall 52 of the barrel 46 is obtained by deformation of the inner face 32 of the body 28 of the reinforcing element 24.

As shown in FIG. 2, the barrel 46 is arranged, for example, aligned with the opening 44 in the transverse direction Y. In the embodiment described here, the barrel 46 is suitable for receiving a fastening element of the lock, such as a screw.

The body 28 for example has a second barrel 54, identical to the first barrel 46, arranged on the other side of the opening 44 in the transverse direction Y, aligned with said opening 44.

Alternatively, the body 28 has more than two barrels for fastening the lock.

Also alternatively, the barrel(s) can be arranged differently relative to the opening 44, and for example be arranged above the opening 44 and/or below the opening 44.

Due to their geometry, the barrels 46, 54 perform an anti-creep function regarding the plastic material of the envelope 26 during the tightening of the fastening elements of the lock.

The reinforcing element 24 can for example be made from metal, such as steel, aluminum, magnesium or the like.

When the reinforcing element 24 is made from metal, the reinforcing element 24 for example has a thickness comprised between 0.5 millimeters (mm) and 5 mm.

Alternatively, the reinforcing element 24 is made from a composite material. For example, the composite material is a glass fiber, carbon fiber or other fiber material, such as natural fibers, embedded in a matrix of thermoplastic or thermosetting material.

When the reinforcing element 24 is made from a composite material, the thickness of the reinforcing element 24 is for example greater than 0.5 mm, and in particular comprised between 0.5 mm and 10 mm.

The envelope 26 will now be described.

As shown in FIG. 2, the envelope 26 is at least partially overmolded on the reinforcing element 24. For example, the envelope 26 is made from a plastic.

In the embodiment described here, the envelope 26 is made in one piece.

In reference to FIG. 3, the envelope 26 has a central portion 58 covering the inner face 32 of the central part 34 of the reinforcing element 24. Thus, the central part 34 of the reinforcing element is overmolded by the central portion 58 of the envelope 26. The central portion 58 of the envelope 26 extends in a plane parallel to the main plane P in which the central part 34 of the body 28 of the reinforcing element 24 extends.

The central portion 58 of the envelope 26 forms an inner part of the envelope 26. In other words, the central portion 58 is oriented toward the inside of the vehicle 10 relative to the reinforcing element 24.

The envelope 26 further has an upper portion 60, visible in FIG. 2, and a lower portion 62 extending from the central portion 58 of the envelope 26, visible in FIGS. 2 and 3. The upper portion 60 and the lower portion 62 are inclined by a non-zero angle relative to the central portion 58 of the envelope 26.

As shown in FIG. 3, the lower portion 62 overmolds a lower free edge 63 of the reinforcing part 24.

The envelope 26 has an outer part comprising at least one segment 64 passing through an orifice 42 and a covering part 66 locally covering the edge of said orifice 42 on the outer face 30 of the body 28 of the reinforcing element 24. The covering part may have a circular or oblong section, in a cutting plane normal to the longitudinal direction X.

"Outer part of the envelope 26" refers to a part of the envelope 26 oriented toward the outside of the vehicle 10 relative to the reinforcing element 24, i.e., extending from the side of the outer face 30 of the reinforcing element 24.

"Locally" means that the covering part 66 extends over a limited area around the edge of the orifice 42 of the reinforcing element 24. In particular, the covering part 66 extends over a limited area of the outer face 30 of the reinforcing member 24 in all radial directions around the orifice 42, from the center of said orifice 42.

For example, the covering part 66 extends over an area extending over a distance comprised between 0.5 mm and 30 mm around the orifice 42, measured from the center of the orifice 42. More precisely, the covering part 66 extends over an area of the outer face 30 of the reinforcing element 24 extending over a distance comprised between 0.5 mm and 30 mm along all radial directions, the distance being measured from the center of this orifice 42. The total dimension of the covering part 66 is for example comprised between 1 mm and 60 mm along all radial directions.

According to another example, the distance measured from the center of the orifice 42 is comprised between 0.25 mm and 15 mm along all radial directions. The total dimension of the covering part 66 is for example comprised between 0.5 mm and 30 mm along all radial directions. In this case, the radius of the orifice 42 is for example comprised between 0.15 and 14.5 mm.

For example, when the covering part 66 is oblong, the dimension of the covering part 66 measured from the center of the orifice 42 is variable. In other words, the dimension of the covering part 66 measured from the center of the orifice 42 varies according to the radial direction among the plurality of radial directions along which said dimension is measured It is understood that the covering area 66 does not cover the entire outer face 30 of the body 28 of the reinforcing element 24.

According to one embodiment, when several orifices 42 are arranged in the body 28 of the reinforcing element 24, the outer part of the envelope 26 comprises a plurality of segments 64 each traversing orifices 42, and a plurality of covering parts 66 locally covering the edge of each of the orifices 42 on the outer face 30 of the reinforcing element 24.

Owing to the segment 64 penetrating the orifices 42 and the covering part 66 locally covering the edge of an orifice 42, precise positioning is provided between the reinforcing part 24 and the envelope 26 and a good mechanical link is created between the reinforcing part 24 and the envelope 26.

In this case, as shown in FIG. 2, a covering part 66 is spaced away from another covering part 66 by part of the outer face 30 of the body 28 of the reinforcing element 24, i.e., there is no material forming the envelope 26 between each of the covering areas 66.

The outer part of the envelope 26 further comprises a transverse rib 68 connecting the covering parts 66 to one another. The transverse rib 68 protrudes from the outer face 30 of the reinforcing element 26 and extends in the transverse direction Y.

The outer part of the envelope 26 further has a plurality of reinforcing ribs 70.

Reinforcing ribs 70 protrude from the outer face 30 of the body 28 of the reinforcing element 24, and extend between an outer face 60A of the upper portion 60 of the envelope and an outer face 62A of the lower portion 62 of the envelope 26 in the elevation direction Z.

Other reinforcing ribs 70 protrude from the outer face 30 of the body 28 of the reinforcing element 24, between an overmolded functional element 71 of the envelope 26, secured to the outer face 60A of the upper portion 60 of the envelope 26, and the outer face 62A of the lower portion 62 of the envelope 26.

The reinforcing ribs 70 have different heights in this example. In the present description, "height" refers to a distance of an element measured in the longitudinal direction X. The reinforcing ribs 70 have heights for example comprised between 1 mm and 60 mm.

In this example, the outer part of the envelope 26 further comprises two end ribs 72, 74 extending between the outer face 60A of the upper portion 60 of the envelope 26 and the outer face 62A of the lower portion 62 of the envelope 26, in the elevation direction Z. The end ribs 72, 74 also protrude from the outer face 30 of the central part 34 of the body 28 of the reinforcing element 24.

The lateral end parts 39, 40 of the reinforcing element 24 are at least partially overmolded respectively by an end rib 72, 74, as shown in more detail in FIG. 4. In particular, each end rib 72, 74 covers the outer face 30 of the lateral end parts 39, 40 of the body 28 and a free edge 39A, 40A of each of the lateral end parts 39, 40.

Alternatively, each end rib 72, 74 covers the inner face 32 of the lateral end parts 39, 40 of the body 28 and a free edge 39A, 40A of each of the lateral end parts 39, 40.

Also alternatively, each end rib 72, 74 covers both the inner face 32 and the outer face 30 of the lateral end parts 39, 40 of the body 28 and a free edge 39A, 40A of each of the lateral end parts 39, 40. In this case, each end rib 72, 74 completely overmolds the lateral end parts 39, 40 of the body 28.

Each of the end ribs 72, 74 has a length substantially equal to the length of the lateral end part 39, 40 that it overmolds.

The transverse rib 68 is secured to the end ribs 72, 74 and the reinforcing ribs 70. The transverse ribs 68, the reinforcing ribs 70 and the end ribs 72, 74 make it possible to limit the deformations of the reinforcing element 24 and to keep the reinforcing element 24 and the main plane P while preventing any movement of said reinforcing element 24 outside the main plane P. This then makes it possible to keep the reinforcing element 24 "tensed".

Overmolding the lateral end parts 39, 40 of the reinforcing element 24 makes it possible to improve the holding power of the envelope 26. Furthermore, the central part 34 of the reinforcing element 24 remains substantially planar when the structural part 20 of the opening part 12 is subjected to forces. In other words, the deformations of the reinforcing element 24 are limited.

Furthermore, as shown in FIG. 3, the upper end portion 36 of the reinforcing element 24 is overmolded by the envelope 26. More specifically, the outer part of the envelope 26 has a rib 78 protruding from the central portion 58 of the envelope 26, in which the upper end portion 36 of the body 28 of the reinforcing element 24 is included.

The rib 78 connects the upper ends of the reinforcing ribs 70 to one another.

Furthermore, as shown in FIGS. 2 and 3, the border 45 of the opening 44 is covered by the envelope 26 and is flush with the outer face 30 of the body 28 of the reinforcing element 24, i.e., the envelope 26 covers the thickness of the reinforcing element 24 at the border 45 of the opening 44.

Owing to these arrangements, the reinforcing element 24 is concealed by the envelope 26 in the opening 44 of the reinforcing element 24.

Furthermore, the fact that the border 45 is covered by the envelope 26 contributes to obtaining a good mechanical bond between the reinforcing element 24 and the envelope 26.

Furthermore, as shown in FIG. 5, the second wall 52 of the barrel 46 is overmolded by the envelope 26. In other words, the inner part of the envelope 26 formed by the central portion 58 of the envelope 26 is flush with a free end 46a of the barrel 46.

The second wall of the other barrel 54 is also overmolded by the envelope 26, i.e., the inner part of the envelope 24 formed by the central portion 58 of the envelope 26 is flush with a free end of the barrel 54.

Owing to this arrangement, the fastening elements of the lock are introduced into the hole 50 formed by the barrel 46, without creep from a plastic part of the envelope 26.

When the reinforcing element 24 has one or several other barrel(s) 54, the fastening elements of the lock are also introduced into each of the holes formed by said barrel(s), without creep from a plastic part of the envelope.

A method for manufacturing the structural part 20 will now be described.

The reinforcing element 24 is first provided. It is inserted into a mold, the mold comprising a die and a punch forming a molding cavity having a shape complementary to that of the envelope 26.

The reinforcing element 24 is arranged in the mold either against the punch, or against the die.

The die and the punch form a chamber in which the reinforcing element 24 is arranged.

Then, the plastic is injected into the chamber and the plastic fills in the chamber, from the punch to the die.

Alternatively, the envelope can be formed by compression around the reinforcing element 24.

Owing to the invention described above, a reinforced structural part 20 of an opening part 12 of a motor vehicle 10 is obtained, in which a good mechanical link is provided between the envelope 26 and the reinforcing part 24.

A good mechanical link between the reinforcing element 24 and the plastic envelope 26 is provided owing to the overmolded surface of the envelope 26 corresponding to the inner part of the envelope 26, owing to the segments 64 of the envelope 26 traversing the orifices 42, and owing to the covering areas 66 locally covering the edges of the orifices 42 on the outer face 30 of the body 28 of the reinforcing element 24.

The good mechanical link between the reinforcing element 24 is also provided owing to the ribs 70 of the envelope 26, the overmolding of the end ribs 39, 40 and the rib 78 of the envelope 26 on the corresponding parts of the reinforcing element 24.

All of these overmolding parts of the envelope 26 on the corresponding parts of the reinforcing element 24 allow a good distribution of forces over the entire reinforcing element 24, unlike the state of the art, where the reinforcing element is attached, then screwed by screws and where the stresses are concentrated only on these fastening points.

Furthermore, owing to the invention, the structural part 20 can be obtained in a single fastening step, i.e., in a single step for overmolding the envelope 26 on the reinforcing element 24.

Owing to the invention, the overmolding operations necessary to obtain a good mechanical link between the reinforcing part 24 and the envelope 26 are limited. The invention also makes it possible to obtain a structural part 20 forming a body of the opening part 12 withstanding mechanical stresses.

Furthermore, the invention makes it possible to obtain a vehicle 10 opening part 12 structural part 20 that is easy and inexpensive to produce.

The invention claimed is:

1. An opening part of a motor vehicle comprising:
   a reinforcing element extending at least partially along a main plane, intended to reinforce fasteners and the environment of a lock of the opening part, an
   an envelope made from plastic, comprising an inner part overmolded at least partially on an inner face of the reinforcing element,
   wherein the reinforcing element comprises a plurality of orifices, and wherein the envelope comprises at least one outer part including a plurality of segments each traversing an orifice of the plurality of orifices of the reinforcing element and a plurality of covering parts each locally covering an edge of an orifice of the plurality of orifices on an outer face of the reinforcing element, the outer part of the envelope comprising at least one rib connecting the covering parts to one another.

2. The opening part of the motor vehicle according to claim 1, wherein each orifice of the plurality of orifices has a circular shape and a center, and wherein, for each orifice of the plurality of orifices, the covering part locally covering the edge of this orifice extends on the outer face of the reinforcing element over a limited area around the orifice and in all radial directions around the orifice, the covering part extending from the center of this orifice over a distance comprised between 0.5 millimeter and 30 millimeters along the said radial directions.

3. The opening part of the motor vehicle according to claim 1, wherein the inner part of the envelope comprises a central portion covering at least part of the inner face of the reinforcing element, extending in a plane parallel to the main plane, the envelope further comprising at least one upper portion and one lower portion each extending from the central portion, the upper portion and the lower portion being inclined by a non-zero angle relative to the central portion and extending protruding from the central portion on the side of the outer face of the reinforcing element.

4. The opening part of the motor vehicle according to claim 3, wherein the outer part of the envelope includes at least one reinforcing rib protruding from the outer face of the reinforcing element, said reinforcing rib extending between the upper portion and the lower portion of the envelope.

5. The opening part of the motor vehicle according to claim 3, wherein the reinforcing element comprises a central part extending at least partially in the main plane and curved lateral end parts forming a non-zero angle with the central part, the envelope comprising at least two end ribs extending between the upper portion and the lower portion of the envelope, each curved lateral end part of the reinforcing element being at least partially overmolded by an end rib.

6. The opening part of the motor vehicle according to claim 5, wherein an upper end of the reinforcing element is inclined relative to the central part of the reinforcing element, the upper end of the reinforcing element being overmolded by the envelope.

7. The opening part of the motor vehicle according to claim 1, wherein an opening is arranged in a thickness of the reinforcing element to receive a lock mechanism of the opening part, a border of the opening extending between the outer face and the inner face of the reinforcing element and being overmolded by the envelope.

8. The opening part of the motor vehicle according to claim 1, wherein the reinforcing element has at least one barrel protruding from the inner face of the reinforcing element, the barrel comprising a first wall defining a hole and a second wall overmolded by the envelope, the second wall being opposite the first wall.

9. The opening part of the motor vehicle according to claim 1, wherein the envelope is formed in a single piece.

10. The opening part of the motor vehicle according to claim 1, forming at least part of a tailgate comprising a lock fastened at least partly on the reinforcing element.

* * * * *